US 7,663,631 B1

United States Patent
Friedman et al.

(10) Patent No.: US 7,663,631 B1
(45) Date of Patent: Feb. 16, 2010

(54) PIXEL ENGINE ARCHITECTURE

(75) Inventors: Vladimir Friedman, Scotch Plains, NJ (US); Michael Hennedy, Holmdel, NJ (US)

(73) Assignee: Analog Devices, Inc., Norwood, MA (US)

(*) Notice: Subject to any disclaimer, the term of this patent is extended or adjusted under 35 U.S.C. 154(b) by 475 days.

(21) Appl. No.: 11/363,683

(22) Filed: Feb. 28, 2006

Related U.S. Application Data

(60) Provisional application No. 60/657,378, filed on Mar. 1, 2005.

(51) Int. Cl.
*G06T 15/00* (2006.01)
(52) U.S. Cl. .................. 345/501; 708/316; 708/524; 712/1; 712/34; 712/218; 375/240.23; 375/240.25
(58) Field of Classification Search ............... 345/501; 708/316, 523, 524, 490; 712/1, 33, 34, 221, 712/218; 375/240.23, 240.25
See application file for complete search history.

(56) References Cited

U.S. PATENT DOCUMENTS

| 6,526,430 B1 * | 2/2003 | Hung et al. ............... 708/523 |
| 6,530,010 B1 * | 3/2003 | Hung et al. ............... 712/1 |
| 6,873,658 B2 * | 3/2005 | Zhou ................... 375/240.25 |

OTHER PUBLICATIONS

Wikepedia, http://en.wikipedia.org/wiki/SIMD, "SIMD" pp. 1-4, Feb. 28, 2006.

* cited by examiner

*Primary Examiner*—Phu K Nguyen
(74) *Attorney, Agent, or Firm*—Goodwin Procter LLP

(57) ABSTRACT

A single-instruction multiple-data processor comprises at least two multiply-accumulator units and associated coefficient memories and data memories. Coefficient memory addresses are formed from a base address and data samples stored in the data memories.

22 Claims, 3 Drawing Sheets

PIXEL ENGINE ARCHITECTURE

PRIORITY INFORMATION

This application claims priority from provisional application Ser. No. 60/657,378 filed Mar. 1, 2005, which is incorporated herein by reference in its entirety.

BACKGROUND OF THE INVENTION

The invention relates to the field of pixel imaging, and in particular a single instruction multiple data (SIMD) processor specialized for video camera digital signal processing applications.

A single instruction multiple data architecture processor consists of several arithmetic units, such as multiply accumulator (MAC) and equal number of data RAMs for storing data and a program memory which generates the controls for the MACs and the address for the data memory. Since there is only one program memory all the units executes the same instruction (multiply, add, shift, data storage) with data coming from the same address from the corresponding data RAMs. The input data may come from a host processor, or another SIMD processor, the outputs are returned to the host processor or to similar processors. On this general concept many variations are possible depending of the application. A pixel engine is one of these variations and the invention provides improvement over such variations.

SUMMARY OF THE INVENTION

According to one aspect of the invention, there is provided a single instruction multiple data processor. The single instruction multiple data processor includes at least one coefficient memory module associated with at least one of a set of colors stores coefficient matrix values and a first look-up table associated with that color. A coefficient memory address is formed to access data associated with the second look-up table in the at least one coefficient memory module by acquiring the sum of a base address stored in a program memory and an index value. At least one multiply accumulator (MAC) unit associated with at least one of the a set of colors aides in the processing of arithmetic operations performed by the pixel engine using information provided by the vignette arithmetic logic unit and the at least one coefficient memory module.

According to another aspect of the invention, there is provided a method of single instruction multiple data processor operations. The method includes providing at least one coefficient memory module associated with at least one of a set of colors stores coefficient matrix values and a first look-up table associated with that color. A coefficient memory address is formed to access data associated with the second look-up table in the at least one coefficient memory module by acquiring the sum of a base address stored in a program memory and an index value. Furthermore, the method includes providing at least one multiply accumulator (MAC) unit associated with at least one of the a set of colors for aiding in the processing of arithmetic operations performed by the pixel engine using information provided by the vignette arithmetic logic unit and the at least one coefficient memory module.

DETAILED DESCRIPTION OF THE INVENTION

The invention describes the architecture of a modified single instruction multiple data processor specialized for video camera digital signal processing applications. Such a unit operates on three color components of the video signal, usually red, green and blue.

Figure 1:
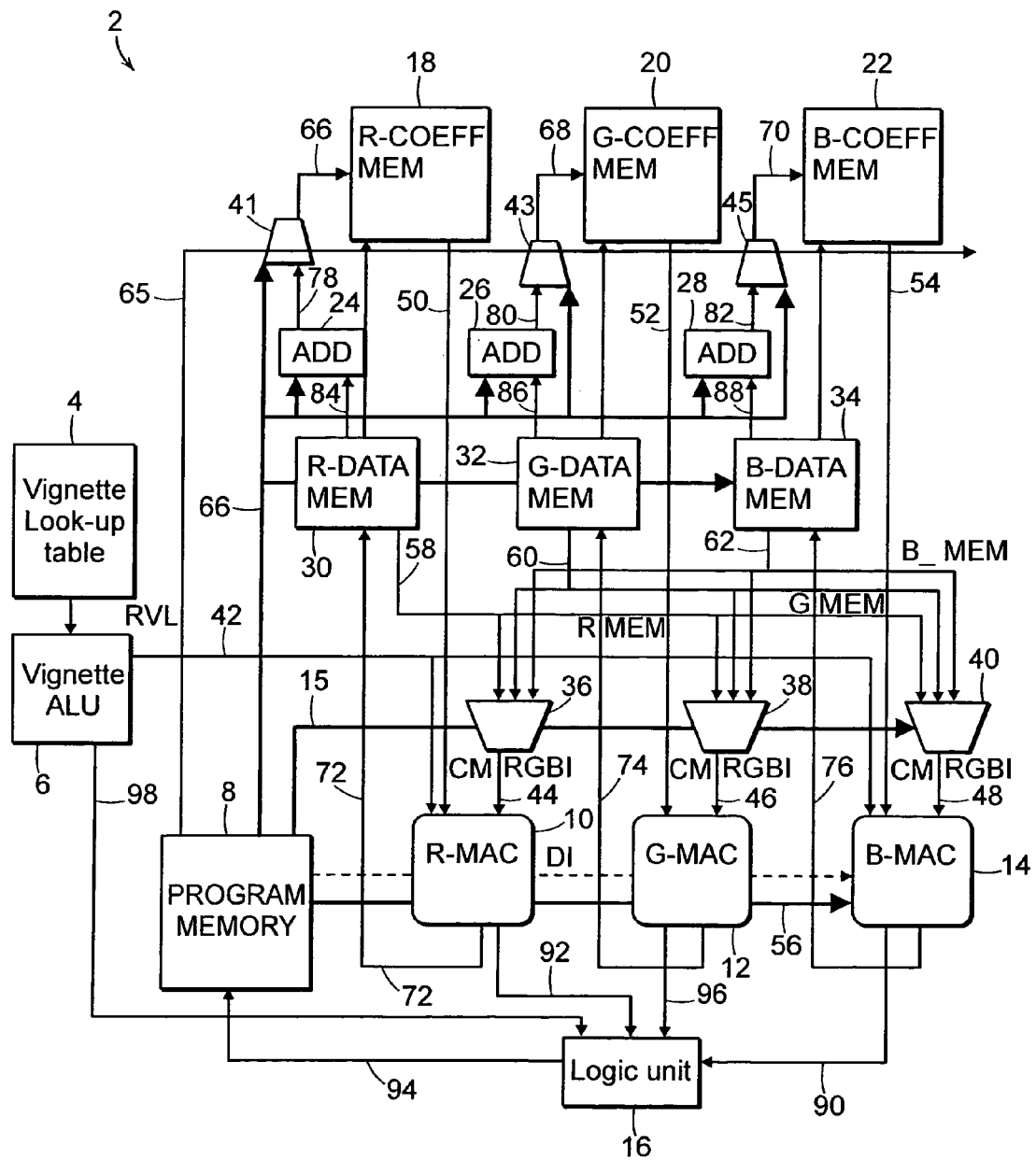
FIG. 1 is a schematic diagram illustrating the invention.

The architecture 2 of the pixel engine is derived from the single instruction multiple data concept that is shown in FIG. 1. Three multiply accumulator (MAC) units 10, 12, 14 are used, one for each color. Each unit has two dedicated memories, coefficient memories 18, 20, 22 and data memories 30, 32, and 34. The coefficient memories 18, 20, 22 store the matrix and spatial filter coefficients and look-up table values for each of the colors red, green, and blue. The data memories 30, 32, and 34 store the color samples for each of the colors red, green, and blue. Histogram values are statistical magnitude for each color, and can be stored in either data 30, 32, and 34 or coefficient memories 18, 20, 22.

Another solution is to store the histogram values in a separate memory, which can be accessed by an external processor. A Vignette coefficient ALU 6 is used to compute the vignette coefficients with the help of a look-up table 4. The inputs to each of the MAC 10, 12, and 14 are the following: the outputs 44, 46, 48 of each of the respective three color multiplexers 36, 38, and 40, the outputs 50, 52, and 54 of each of the respective coefficient memories 18, 20, 22, and the vignette coefficient ALU output signal 42. There is one program memory 8. Each of the three MACs 10, 12, and 14 execute the same instruction with its own data and coefficients. Note the MACs 10, 12 14 also are controlled by output signal 56 from the program memory 8. FIG. 1 shows three MACs 10, 12, and 14, however, the number can vary in other embodiments.

Each of the multiplexer 36, 38, and 40 receives as input a control signal 66 from the program memory 8 and the output signals 58, 60, and 62 associated with the data memories 30, 32, and 34. Each of the coefficient memories 18, 20, and 22 receive as input the output signals 72, 74, and 76 of each of the MACs 10, 12, and 14 respectively, and the output address signals 66, 68, and 70 of each of the multiplexers 41, 43, and 45. Each of the multiplexers 41, 43, and 45 receive as input the base address signal 66 of the program memory 8, a control line signal 65 from the program memory 8, and the output signals 78, 80, 82 of each of the adders 24, 26, and 28. The adders 24, 26, and 28 receive as input the base address signal 66 from the program memory 8 and output signals 84, 86, and 88 respectively.

The processing of quasi-Bayer color formats requires four units: one for red, one for blue and two for the two green colors. The chrominance filtering for YUV color formats may require only two units, one for U chrominance the other for V.

In a typical single instruction multiple data implementation only one address coming from the program memory is used to access the all coefficient memories. This feature was modified for the invention which allows the access of a look-up tables. The base address is kept in the program memory 8. The data from color data memory 30, 32, and 34 generates the index.

The output signals 78, 80, 82 of each of the adders 24, 26, and 28 are used to access the individual coefficient memories. This means that each coefficient memory 18, 20, and 22 has its own RAM decoder. For clarity purpose the summation was done using a separate adder; however this addition can be done inside the MAC units 10, 12, and 14. In this case the MAC 10, 12, and 14 need another input carrying the base address from the program memory 8. This is shown with a signal line marked D1 in FIG. 1. Each of the multiplexers 36, 38, and 40 receives as input a control signal 15 from the program memory 8 and the output signals 58, 60, and 62 associated with the data memories 30, 32, and 34. The coefficient memories 18, 20, and 22 receives as input output signals 66, 68, and 70 of the multiplexers 42, 44, and 46 and output signals 72, 74, and 75 of the MACs 10, 12, and 14.

The outputs signals 90, 92, and 96 from the MACs 10, 12, and 14 are sent to a programmable logic unit 16 together with the signal 98 from the Vignette ALU 6. The output signal 94 of the logic unit can be used to implement conditional instructions. The look-up tables stored in the coefficient memories 18, 20, and 22 operations are defined as $$R_{out}=\text{LUTR}(R_{in})$$
$$G_{out}=\text{LUTG}(G_{in})$$
$$B_{out}=\text{LUTB}(B_{in})$$

Eq. 1 where LUTR, LUTG, and LUTB are look-table operations performed using information provided by output signals 66, 68, and 70 and $R_{in}$, $G_{in}$, and $B_{in}$ are associated with pixel data from the data memories 30, 32, and 34. Vignetting distortions are taking into consideration by compensation for gradual fading out of an image near the periphery. Vignetting distortions are defined as $$R_{out}=R_{in}(i,j)\cdot\text{Corr}(i,j)$$
$$G_{out}=G_{in}(i,j)\cdot\text{Corr}(i,j)$$
$$B_{out}=B_{in}(i,j)\cdot\text{Corr}(i,j)$$

Eq. 2 where all three colors are multiplied by the same coefficient, which is a function of pixel position (i,j) only. The coefficient could be retrieved from a look-up table. This will require a large memory. It is recommended that a mixed approach of look-up table 4 together with coefficient computation interpolation 6 be used.

The histogram is a statistic which computes the pixel value distribution in a video frame, for example, how many pixels have a certain value. It is computed separately for the three colors. Based on this the host adjusts the filter coefficients and the look-up tables. In the pixel engine the histogram is computed as shown below:

$$\text{HISTR}(R_{in})=\text{HISTR}(R_{in})+1$$
$$\text{HISTG}(G_{in})=\text{HISTG}(G_{in})+1$$
$$\text{HISTB}(B_{in})=\text{HISTB}(B_{in})+1$$

Eq. 3

The program memory 8 generates the base address of the histogram stored in the coefficient memory 18, 20, and 22, data is used to generate the index 84, 86, and 88. The sum of the base address and the output of the adders 78, 80, 82 is used to access the coefficient RAM. The RAM data is incremented in the MAC and is written back at the same location.

Figure 2:
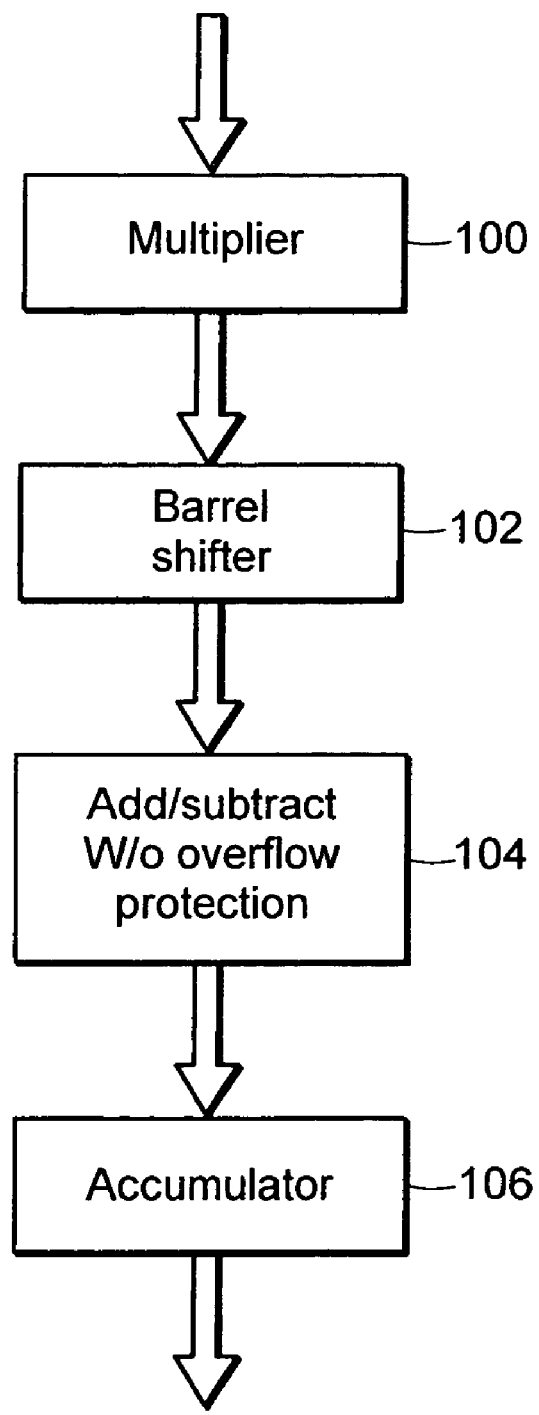
FIG. 2 is a schematic block diagram illustrating the steps performed by a multiply accumulator (MAC) unit used in accordance with invention.

FIG. 2 illustrates a schematic block diagram detailing the operations of the inventive MAC unit. The MAC units 10, 12, and 14 performs various arithmetic operations. The first being a multiplication and addition, shown as steps 100 and 104, defined as $$R_{out}=c_1*R_{in}+c_2*G_{in}+c_3*B_{in}$$
$$G_{out}=c_4*R_{in}+c_5*G_{in}+c_6*B_{in}$$
$$B_{out}=c_7*R_{in}+c_8*G_{in}+c_9*B_{in}$$

Eq. 4

$R_{out}$, $G_{out}$, and $B_{out}$ are associated with output signals 96, 92, and 90 respectively of the MACs 10, 12, and 14 $R_{in}$, $G_{in}$, and $B_{in}$ are associated with outputs signals 58, 60, and 62 provided to the multiplexer 36, 38, and 40, and $c_1$-$c_9$ are associated with the output signals 50, 52, and 54 of the coefficient memories 18, 20, and 22. A second operation performed is the barrel shifter operation, as shown in step 102. The barrel shifter performs shifting of various bits received by a factor of at least two. The third operation performed is the overflow and underflow protection, shown as step 104, defined as $$R_{out}=\min(\max(R_{in}-c_R,0),2^b-1)$$
$$G_{out}=\min(\max(G_{in}-c_G,0),2^b-1)$$
$$B_{out}=\min(\max(B_{in}-c_B,0),2^b-1)$$

Eq. 5 where b is number of bits per pixel. An accumulator is used to aid in performing all the operations of Eqs. 1-4, as shown in step 106.

Figure 3:
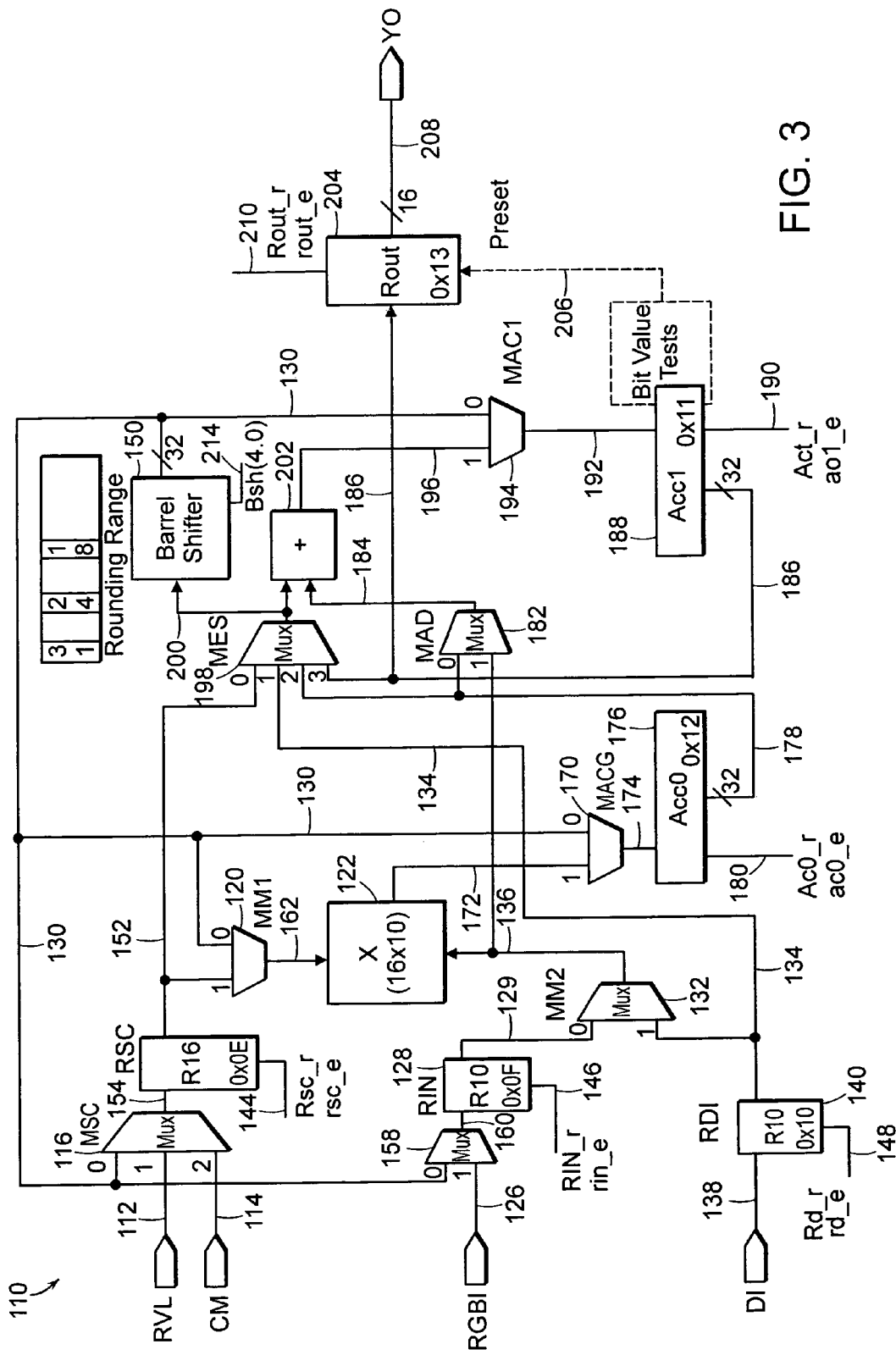
FIG. 3 is a detailed schematic diagram illustrating the elements used in a MAC unit.

FIG. 3 is a detailed schematic diagram illustrating the elements used in a MAC unit 110. The MAC unit 110 includes a multiplexer 116 that receives as input the output signal 130 of the barrel shifter 150, a vignette signal 112, and a coefficient signal 114. The multiplex 118 provides its output signal 130 to a register 118. The register 118 also receives as input a program memory control signal 156. A multiplexer 158 receives as input the output signal 130 and a multiplexed color data signal 126. The output signal 160 of the multiplexer 158 is provided as input to a register 128, which also receives as input a program memory control signal 146. A register 140 receives as input a table look-up base address signal 138 and a program memory control signal 148. A multiplexer 132 receives as input the output signal 129 of the register 128 and the output signal 134 of the register 140. A multiplexer 120 receives as input the output signal 130 and output signal 152 of the register 118. A multiplier 122 receives the output signal 162 of the multiplexer 120 and the output signal 136 of the multiplexer 132. The multiplexer 170 receives as input the output signal 130 and the output signal 172 of the multiplier 122.

An accumulator 176 receives as input the output signal 174 of the multiplexer 170 and a program memory control signal 180. A multiplexer 182 receives as input the output signal 136 and the output signal 178 of the accumulator 176. The multiplexer 198 receives as input output signals 152, 134, 178, and the output signal 186 of an accumulator 188. An adder 202 receives the output signal 200 of the multiplexer 198 and output signal 184 of the multiplexer 182. The barrel shifter 150 receives as input the output signal 200 and a program memory control signal 214. A multiplexer 194 receives as input the output signal 130 and the output signal 196 of the adder 202. An accumulator 188 receives as input the output signal 192 of the multiplexer 194 and the program memory control signal 190. A register 204 receives as input output signal 186 of the accumulator 188 and the output signal 206 of the accumulator 188. The register 204 provides as output the signal 208.

For look-up table operations performed by the MAC 110, the multiplexed color data signal 126 and table look-up base address signal 138 are added to produce an address represented by the output signal 186 and provided to the register 204. The address generation for a histogram is identical to the procedure used for the look-up table. The computed address is saved in an external register and used to access memory where the histogram is stored.

Although the present invention has been shown and described with respect to several preferred embodiments thereof, various changes, omissions and additions to the form and detail thereof, may be made therein, without departing from the spirit and scope of the invention.

What is claimed is:

1. A modified single-instruction multiple-data processor comprising:
   a first multiply-accumulator unit and, associated therewith, a first data memory and a first coefficient memory;
   a second multiply-accumulator unit and, associated therewith, a second data memory and a second coefficient memory; and
   a program memory providing a base address;
   wherein each multiply-accumulator unit receives as an input at least one coefficient stored in the associated coefficient memory at a memory address corresponding to the sum of the base address and a data sample stored in the associated data memory.

2. The modified single-instruction multiple-data processor of claim 1 wherein the first data memory is associated with a first color parameter and the second data memory is associated with a second color parameter.

3. The modified single-instruction multiple-data processor of claim 2 wherein the data samples comprise color values.

4. The modified single-instruction multiple-data processor of claim 2 wherein the first color parameter is U chrominance and the second color parameter is V chrominance.

5. The modified single-instruction multiple-data processor of claim 1 further comprising a third multiply-accumulator unit and, associated therewith, a third data memory and a third coefficient memory.

6. The modified single-instruction multiple-data processor of claim 5 wherein the first data memory is associated with red, the second data memory is associated with blue, and the third memory is associated with green.

7. The modified single-instruction multiple-data processor of claim 5 further comprising a fourth multiply-accumulator unit and, associated therewith, a fourth data memory and a fourth coefficient memory.

8. The modified single-instruction multiple-data processor of claim 7 wherein the first data memory is associated with red, the second data memory is associated with blue, the first data memory is associated with a first type of green, and the second data is associated with a second type of green.

9. The modified single-instruction multiple-data processor of claim 1 wherein the at least one coefficient comprises a look-up table value.

10. The modified single-instruction multiple-data processor of claim 1 wherein the multiply-accumulator units receive instructions form the program memory.

11. The modified single-instruction multiple-data processor of claim 10 wherein all multiply-accumulator units receive the same instructions.

12. The modified single-instruction multiple-data processor of claim 11 further comprising a vignette arithmetic logic unit providing a vignette coefficient to each of the multiply-accumulator units.

13. The modified single-instruction multiple-data processor of claim 11 further comprising, associated with each multiply-accumulator unit, a multiplexer.

14. The modified single-instruction multiple-data processor of claim 13 wherein each multiplexer provides an output signal to the associated multiply-accumulator unit based on input signals from the data memories.

15. The modified single-instruction multiple-data processor of claim 10 wherein the instructions comprise instructions for at least one of a multiply-operation, an add-operation, a shift-operation, or a data-storage-operation.

16. The modified single-instruction multiple-data processor of claim 1 further comprising a vignette look-up table.

17. A method of performing single-instruction multiple-data processor operations comprising:
   providing a plurality of multiply-accumulator units and, associated therewith, a corresponding plurality of data memories and a corresponding plurality of coefficient memories;
   for each of the multiply-accumulator units, (i) forming a coefficient memory address by adding a data sample stored in the associated data memory to a base address, and (ii) providing at least one coefficient stored in the associated coefficient memory at the memory address to the multiply-accumulator unit, and (iii) providing the coefficient to the multiply-accumulator unit for further processing.

18. The method of claim 17 wherein each of the multiply-accumulator units is associated with one of a set of color parameters.

19. The method of claim 18 wherein the set of colors comprises red, blue, and green.

20. The method of claim 17 wherein the processing comprises at least one of a multiply-operation, an add-operation, a shift-operation, or a data-storage-operation.

21. The method of claim 17 wherein the base address is provided by a program memory.

22. The method of claim 21 wherein the processing comprises executing instructions provided by the program memory.

* * * * *